Jan. 28, 1969     J. T. BRADY     3,424,133
EXERCISING ATTACHMENT
Filed Jan. 13, 1967     Sheet 1 of 2

John T. Brady
INVENTOR.

Jan. 28, 1969 J. T. BRADY 3,424,133
EXERCISING ATTACHMENT
Filed Jan. 13, 1967

John T. Brady
INVENTOR.

United States Patent Office 3,424,133
Patented Jan. 28, 1969

3,424,133
EXERCISING ATTACHMENT
John T. Brady, 8805 Fairhaven Road,
Little Rock, Ark. 72205
Filed Jan. 13, 1967, Ser. No. 609,042
U.S. Cl. 119—29    6 Claims
Int. Cl. A01k 15/00

ABSTRACT OF THE DISCLOSURE

An attachment for the lower portion of the front leg of a horse adapted to be utilized singly or in pairs and on a horse while the latter is being walked through a body of water, the attachment being constructed so as to resist rearward movement of the front legs of the horse through the water and in conjunction with the horse having a portion of its total weight buoyed up by the water either by displacement of a sufficient quantity of water by the body of the horse or by additional displacement of water by means of flotation devices supported from the horse.

---

The aquatic muscle exercising attachment of the instant invention has been designed to strengthen the front legs of thoroughbred race horses. The weakest physical points in a thoroughbred race horse are the front legs and in particular the portions thereof from the knees down. These weaker physical points include the bone, muscle, rudimentary tendons and other portions which often become damaged. A thoroughbred race horse does not become fully developed until he reaches the age of 4½ to 5 years old and extensive racing of 2- and 3-year-old thoroughbreds causes a large percentage of such 3- to 4-year-olds to have some physical trouble with their front legs before reaching the age of 4. The front legs do not develop in proportion with the increase in body weight during the earlier years of a horse. As a 1- to 2-year-old thoroughbred runs the body weight which has advanced in magnitude ahead of the development of the strength of the legs causes tissue breakdown in the joints and tendons of the lower portions of the front legs of the horse.

By using the aquatic muscle exercising attachment of the instant invention on a thoroughbred race horse at an early age the physical development of the front legs toward mature development can be accelerated and kept more in pace with the early gain in body weight. The exercising attachment of the instant invention has been specifically designed for attachment to the lower portions of the front legs of a race horse in a manner so as to not injure the leg or apply excess pressure to any critical point thereon. The attachment includes a pair of semi-cylindrical resilient mounting bodies or sections and adjustable strap means which may be encircled about the semi-cylindrical resilient body sections after they have been applied to a horse's leg. Then, the adjustable strap means may be tightened so as to compressively engage the resilient body sections and thereby support the resilient body sections and the adjustable strap means from the leg of a horse in an efficient manner which will not cause damage to or be uncomfortable on the horse's leg. Suitable water drag fin means are supported from the strap means by means of mounting assemblies carried by the strap means and adjustable longitudinally therealong. The mounting assemblies pivotally suport the water drag fin means for limited oscillation about axes generally paralleling the portion of the leg of the horse to which the attachment is secured and the pivotal action of the water drag fin means is such that they offer little resistance to forward movement of the associated leg through a body of water but an adjustable amount of resistance to rearward movement of the horse's legs through the water.

The main object of this invention is to provide an aquatic muscle exercising attachment for race horses which may be utilized to accelerate front leg muscle and strength development during the earlier growing years of the horse toward maturity.

Another object of this invention is to provide an aquatic muscle exercising attachment which may be readily attached to the front legs of different horses.

A still further important object of this invention is to provide an attachment for the front legs of a horse which may be secured to the latter in a manner such that no damage will be inflicted upon the horse and the horse will experience no discomfort.

A further object of this invention is to provide an aquatic muscle exercising attachment for the front legs of a horse operative to produce a variable drag on the associated legs of the horse as they move rearwardly through a body of water.

A final object of this invention to be specifically enumerated herein is to provide an aquatic muscle exercising attachment in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
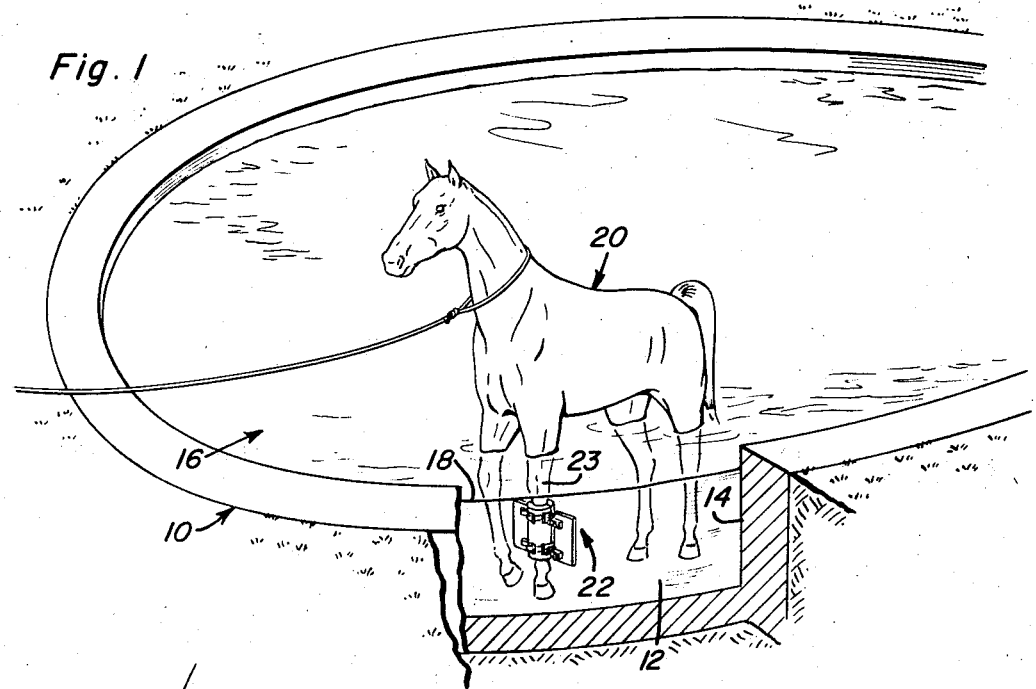
FIGURE 1 is a perspective view of a suitable water tank about which a horse utilizing the attachment of the instant invention may be walked and with one of the attachments attached to the lower portion of the left front leg of the horse.

Referring now more specifically to the drawings the numeral 10 generally designates a sunken tank including a bottom 12 and peripheral side walls 14. A quantity of water 16 is disposed within the tank 10 to the level 18 and a race horse generally referred to by the reference numeral 20 is disposed within the tank 10 in a standing position with one of the attachments of the instant invention generally referred to by the reference numeral 22 attached to the lower portion of the front leg 23 of the horse 20.

Figure 2:
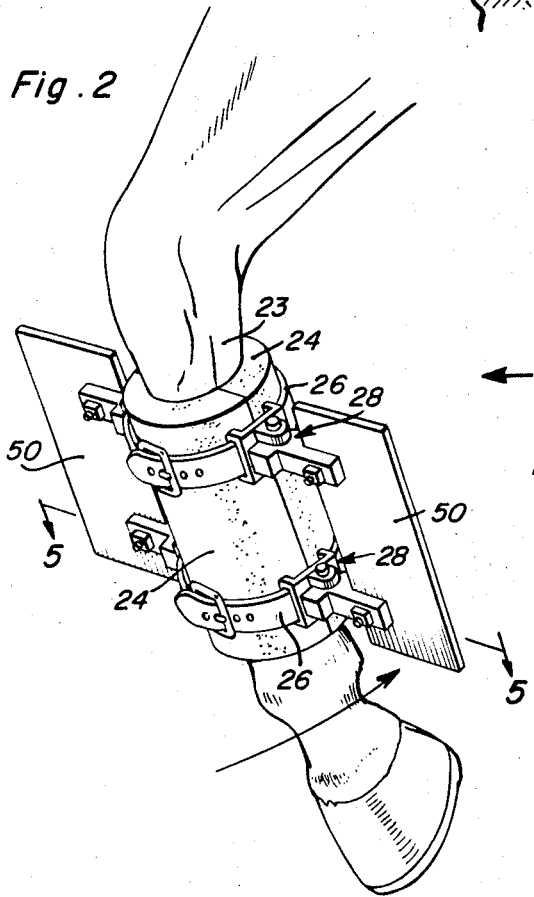
FIGURE 2 is a fragmentary enlarged perspective view of the left front leg of the horse more clearly illustrating the manner in which the attachment of the instant invention is secured thereto.
Figure 4:
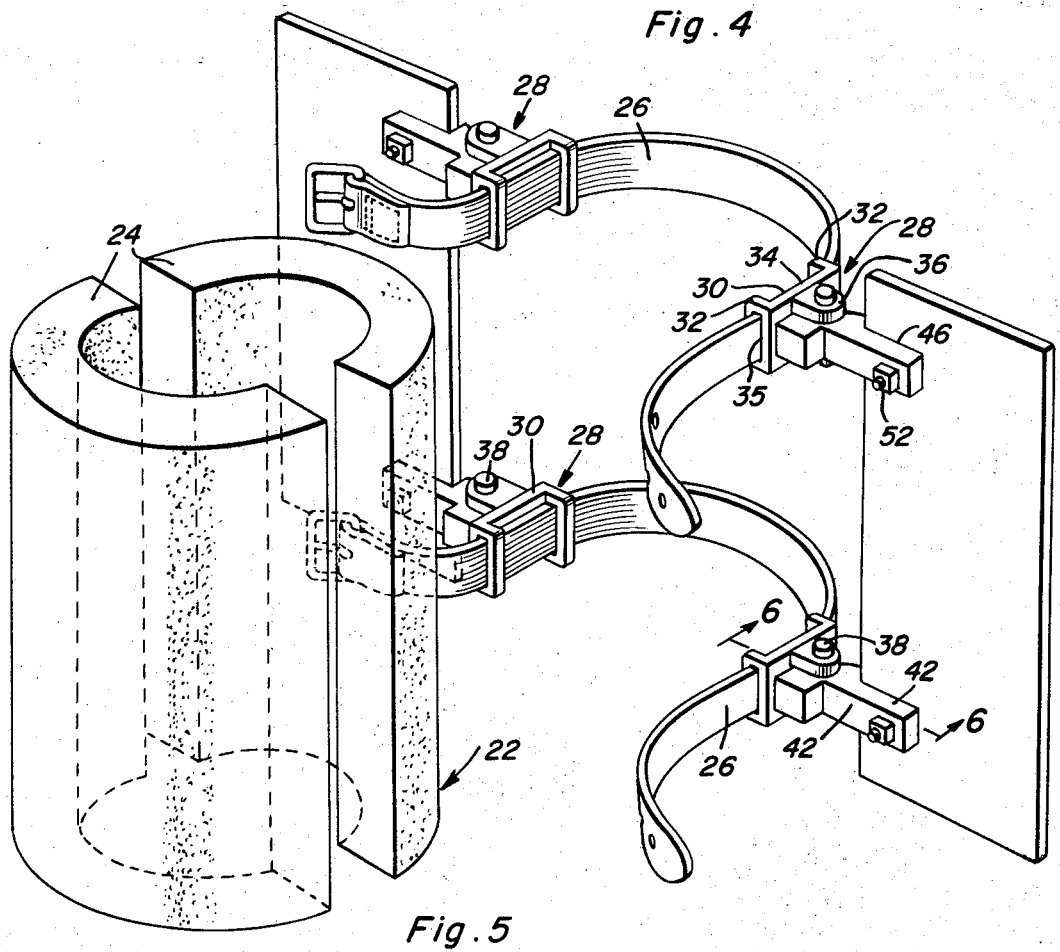
FIGURE 4 is an exploded perspective view of the attachment.
Figure 5:
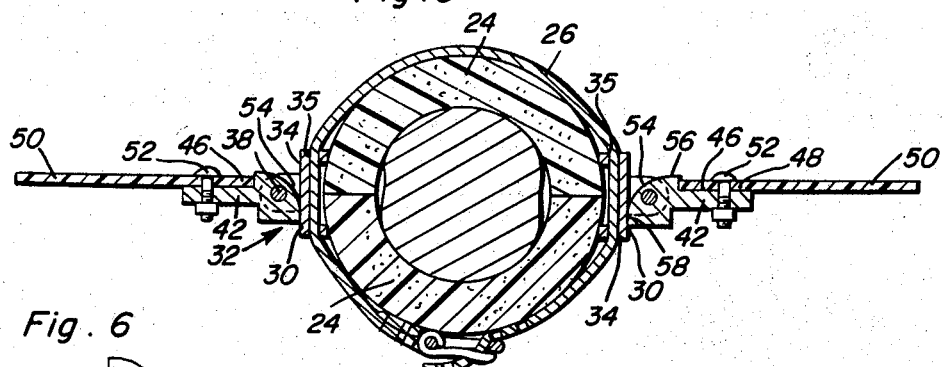
FIGURE 5 is an enlarged horizontal sectional view taken substantially upon the plane indicated by the section line 5—5 of FIGURE 2.
Figure 6:
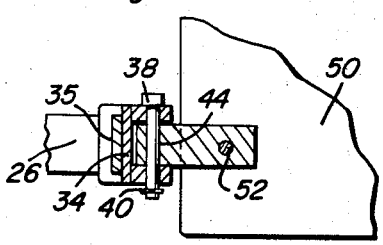
FIGURE 6 is a fragmentary vertical sectional view taken substantially upon the plane indicated by the section line 6—6 of FIGURE 4.

As can best be seen from a comparison of FIGURES 2, 4 and 5 of the drawings the attachment 22 includes mounting means in the form of a pair of generally one-half cylindrical resilient body sections 24, adjustable length strap means including a pair of straps 26, and a plurality of supporting brackets generally referred to by the reference numeral 28.

The semi-cylindrical and resilient body sections 24 are disposed about diametrically opposite portions of the lower portion of the leg 24 and the adjustable length straps 26 are encircled about the leg 24 over the outer surface portions of the semi-cylindrical resilient body sections 24.

The support brackets each comprise a pair of upstanding channel-shaped members 30 including a pair of generally parallel flange portions 32 interconnected along corresponding edges by means of a bight portion 34. The flange portions 32 of each channel member 30 are provided with aligned slots 35 through which the corresponding strap 26 is slidingly received, the slots 35, however, being of dimensions to enable the corresponding strap 26 to be frictionally gripped at points spaced longitudinally therealong. Each of the channel members 30 includes a pair of vertically registered apertured mounting lugs 36 through which a suitable pivot pin 38 is secured by means of a fastener 40.

Each of the support brackets 28 has one end of a support arm 42 disposed between the corresponding apertured mounting lugs 36 and the associated pivot pin 38 is rotatably received through a suitable bore 44 formed in the arm 42. The outer end portion of each arm 42 is relieved as at 46 and has one marginal edge portion 48 of a water flow resisting fin 50 secured thereto by means of a suitable fastener 52. Each fin 50 is supported by a corresponding pair of arms 42 pivotally supported in turn from a pair of corresponding channel members 30.

Figure 3:
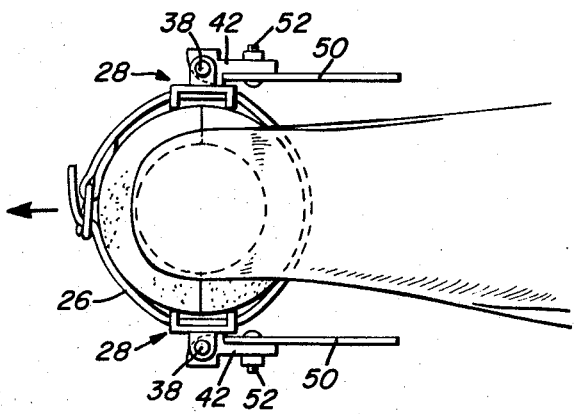
FIGURE 3 is a top plan view of the illustration of FIGURE 2.

The inner end of each arm 42 includes a partial cylindrical bearing surface 54 closely opposing the outer surface of the corresponding bight portion 34 and which terminates at its opposite ends in flat abutment surface portions 56 and 58 engageable with the outer surface of the corresponding bight portion 34 to limit oscillation of the corresponding arm 42. Accordingly, it may be seen that each arm 42 is oscillatable between limits angularly displaced approximately 90 degrees relative to each other in which the fins 50 are disposed in the positions illustrated in FIGURES 2 and 3 of the drawings. When the leg 23 is moving rearwardly through the water 16, it may be seen that the fins 50 pivot toward planar positions projecting outwardly from opposite sides of the leg 23 so as to resist rearward movement of the leg 23 through the water 16. However, when the horse 20 swings the leg 23 forwardly, the fins 50 pivot from the positions thereof illustrated in FIGURE 2 of the drawings to the positions thereof illustrated in FIGURE 3 of the drawings in which the attachment offers little resistance to movement through the water.

By exercising the front legs 23 of the horse 20 through the use of one or two of the attachments 22 attached to one or both front legs 23 while the horse 20 is walked forwardly through the water 16, physical development of the leg or legs 23 having an attachment 22 mounted thereon may be accelerated. Of course, the attachments 22 are to be utilized on young thoroughbred horses before they reach the racing age and therefore to accelerate physical development of the front legs of thoroughbred horses prior to their first racing days. Additionally, the attachments 22 may be also utilized after any horse has reached his first racing days and until and even after the front legs of the horse have fully developed.

Inasmuch as the straps 26 are tensioned about the resilient body sections 24, the channel members 30 are frictionally retained in adjusted position therealong. However, the straps 26 may be loosened and the channel members 30 may be shifted longitudinally thereof as desired which will of course alter the attitude of the fins 50 when the horse's leg 23 is moving rearwardly through the water 16. Further, the straps 26 may be shifted circumferentially about the resilient body sections 24 so as to simultaneously incline the fins 50 whereby the horse 20 may be caused to correct any slight unwanted lateral movement of his front legs 23. In addition, the fins 50 may be constructed of any suitable material such as plastic or rubber and of any suitable size.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. The method of exercising the front legs of a horse at an early age so as to more fully develop the legs in proportion to the early increase in body weight inherent in horses, said method comprising the steps of walking the horse through a body of water of predetermined depth and with water drag apparatus attached to the front legs of the horse to resist rearward movement of the front legs through the water while a portion of the weight of the horse is buoyed up by displacement of the desired quantity of said water.

2. An exercising device for the front legs of a horse including partial cylindrical resilient body means adapted to embrace a lower portion of the front legs of the horse, adjustable strap means adapted to compressively engage and encircle the resilient body means on each leg to hold the same in place, and pivotal water drag fin means secured with the strap means whereby when the horse is confined in a pool of water of predetermined depth the drag fin means resist rearward movement of the front legs through the water.

3. The combination of claim 2 wherein said resilient body means defines at least a substantially complete generally cylindrical sleeve adapted to at least substantially fully encircle said lower portion.

4. The combination of claim 3 wherein said resilient body sections are generally one-half cylindrical in configuration.

5. The combination of claim 2 wherein said water drag fin means are supported from said strap means for limited oscillation about a longitudinal axis of the body means.

6. The combination of claim 2 wherein said drag fin means each includes a support bracket and a fin secured to each bracket for limited oscillation relative thereto, said support bracket each being supported from a corresponding strap means for adjustable positioning therealong, whereby said support bracket, and thus said fins, may be shifted in position about the associated leg.

References Cited

UNITED STATES PATENTS

| 1,130,209 | 3/1915 | Sommerfeld | 9—303 |
| 1,548,054 | 8/1925 | Meadows | 9—303 |
| 1,824,712 | 9/1931 | De Noya | 9—303 |
| 1,945,226 | 1/1934 | Lutsche | 54—82 |

HUGH R. CHAMBLEE, *Primary Examiner.*

U.S. Cl. X.R.

9—303